UNITED STATES PATENT OFFICE.

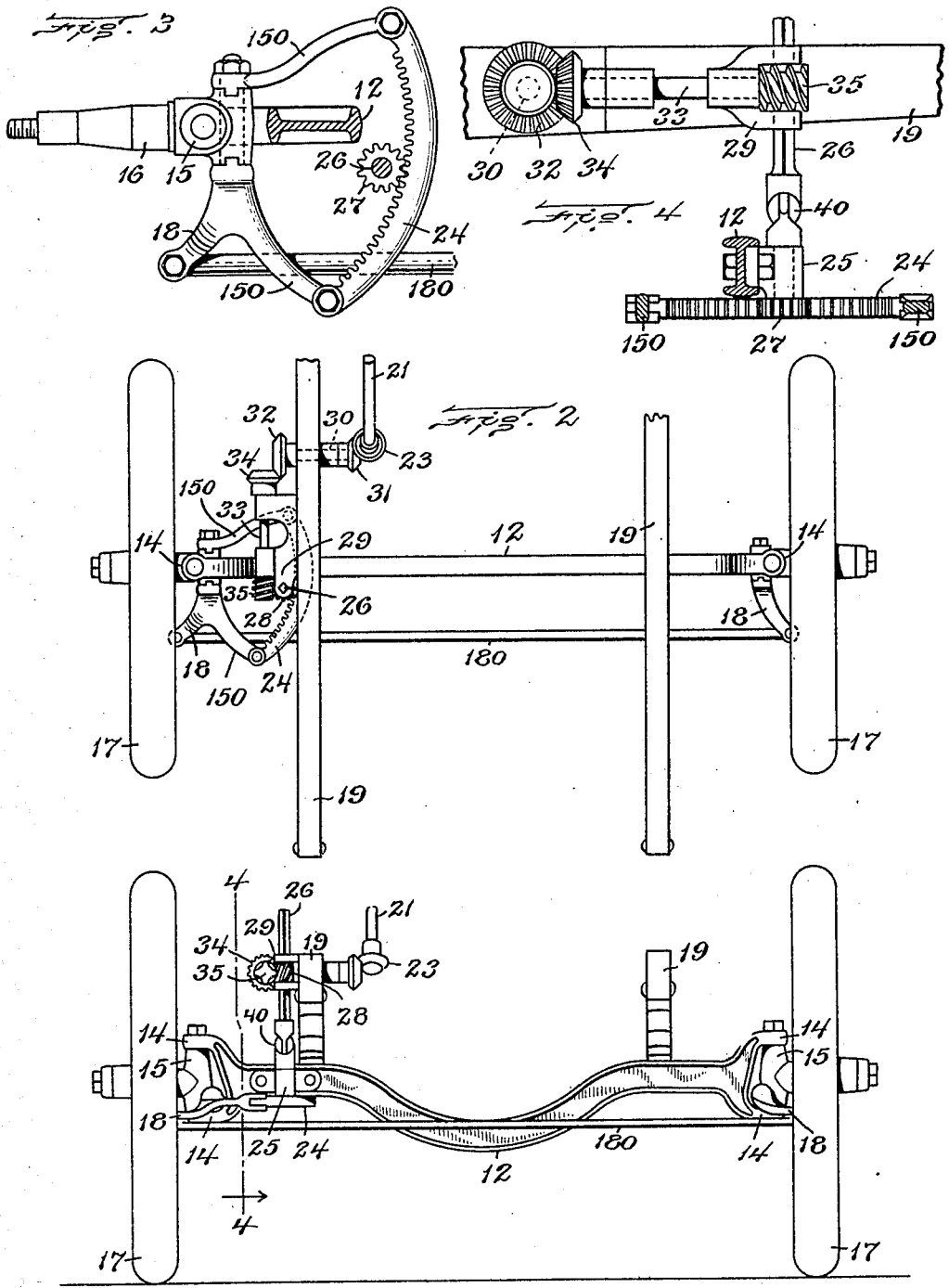

ARSENE PARÉ, OF TAUNTON, MASSACHUSETTS.

STEERING MECHANISM FOR MOTOR-VEHICLES.

No. 904,146.　　　　Specification of Letters Patent.　　　Patented Nov. 17, 1908.

Application filed April 2, 1908. Serial No. 424,758.

*To all whom it may concern:*

Be it known that I, ARSENE PARÉ, of Taunton, in the county of Bristol and State of Massachusetts, have invented certain new and useful Improvements in Steering Mechanism for Motor-Vehicles, of which the following is a specification.

This invention relates to a motor vehicle, comprising a running gear frame, which includes the usual front and rear axles and steering wheels pivoted to the front axles, and a body mounted on springs which are supported by the running gear frame, the body being independently movable toward and from said frame.

The invention has for its object to provide improved means for imparting steering movements from the steering shaft, mounted as usual on the body, to the steering wheels, said mechanism being of such nature that the steering wheels are at all times positively held in any position to which they may be turned to guide the vehicle so that there is no liability of the wheels being accidentally turned or deflected by contact with a stone or other obstruction on the road.

The result aimed at by my invention is to prevent the possibility of loss of control of the vehicle by the chauffeur, such as is frequently caused by accidental turning of the steering wheels when one of them strikes a stone or other obstruction.

The invention consists in the improvements which I will now proceed to describe and claim.

Of the accompanying drawings forming a part of this specification,—Figure 1 represents a front end elevation of such portions of a motor vehicle as are required to illustrate my invention. Fig. 2 represents a top plan view of the same. Fig. 3 is a detail plan of the segment and pinion and adjacent parts on a larger scale than Fig. 2. Fig. 4 represents a section on line 4—4 of Fig. 1 on a larger scale.

The same letters of reference indicate the same parts in all the figures.

A motor vehicle to which my invention is applied, has the usual rigid running gear frame, on which the wheels are mounted, said frame including a front cross bar or axle 12, and suitable longitudinal connections between the front axle and the rear axle. On the forward portion of the running gear frame, and preferably on the ends of the axle 12, are vertical bearings 14, in which are journaled vertical arms 15 affixed to the horizontal stub axles 16 on which the steering wheels 17 are mounted. The axle arms 15 are adapted to turn freely in the bearings 14, to permit the usual steering movements of the steering wheels, and are caused to turn in unison by a rod 180 jointed at its ends to arms 18 affixed to the axles 16. The body of the vehicle is supported as usual by springs mounted on the running gear frame. The only parts of the body here represented are the longitudinal bars 19, the usual upper works, including the seat or seats and other parts of the body, being omitted. The body being yieldingly supported by the springs, is vertically movable toward and from the running gear frame as usual.

21 represents the steering shaft, which is journaled in suitable bearings on the body, and has a suitable steering wheel or handle in convenient position to be manipulated by the chauffeur. To the steering shaft 21 is affixed a bevel gear 23.

To one of the vertical axle arms 15 is affixed a horizontal gear segment 24, the teeth of which face inwardly, said segment being supported by arms 150 projecting from said arm 15. Connections are provided between the bevel gear 23 on the steering shaft and the gear segment 24, whereby steering movements are communicated from the steering shaft to the segment, the nature of said connections being such that they are adapted to hold the steering wheels at any position to which they may be turned to steer the vehicle, so that the steering wheels cannot be turned by contact with an obstruction on the road, and can only be turned by the rotation of the steering shaft. The chauffeur, therefore, has complete control over the steering wheels, and cannot lose control of the same by contact of either wheel with an obstruction on the track. The said connections in this embodiment of my invention are as follows: 26 represents a vertical shaft which is journaled in a bearing 25 affixed to the running gear frame. To said shaft is affixed a gear 27 meshing with the gear segment 24. The upper portion of the shaft 26 has splined on it a spiral gear 28, which is mounted in a slotted ear 29 on the body of the vehicle. The spline connection between the spiral gear 28 and the shaft 26 may be of any preferred form; either by a feather of one member sliding in a groove in the other member, or by forming the shaft polygonal and having the socket in the gear correspondingly formed. In either case the shaft has a sliding fit in the bore or socket of the gear but so that they must rotate together. The gear 28 is therefore rotatively engaged with the shaft 26, and is at the same time adapted to slide vertically thereon, as required by the independent movements of the body on the springs. 30 represents a transverse shaft journaled in bearings on the body, and having a bevel gear 31 meshing with the bevel gear 23 on the steering shaft 21. To one end portion of the transverse shaft 30 is affixed a bevel gear 32. 33 represents a longitudinal shaft journaled in bearings on the vehicle body, said shaft having a bevel gear 34 meshing with the bevel gear 32 of the transverse shaft, and a spiral gear 35 meshing with the spiral gear 28 which slides on the vertical shaft 26.

It will be seen that when the steering shaft is rotated, motion is communicated from it through the several gears and shafts to the gear segment 24 and to the steering wheels. The several gears and shafts act to hold or lock the steering wheels in any position to which they may be turned, so that the wheels can only be turned by the rotation of the steering shaft, and cannot be accidentally displaced by contact with obstructions on the road.

Preferably I form the shaft 26 in two sections united by a universal or knuckle joint 40. This is because when an unevenness in the road causes one of the wheels 17 to rise higher than the other, there is a tendency to bring the running gear frame to a position which is referred to as somewhat askew relative to the vehicle body frame. The universal or knuckle joint 40 permits the cross bar or axle 12 to tilt somewhat under such circumstances without straining the shaft 26.

It is to be understood that the squared or splined mounting of the spiral gear 28 on the shaft 26 will be, in practice, sufficiently loose to allow it to have the necessary lateral or oscillating motion, to permit the upper section of said shaft to swing at the knuckle joint 40 when the axle 12 tilts as just described.

Various changes and modifications in the connecting mechanism may be made without departing from the spirit of the invention.

I claim:—

A motor vehicle comprising a running gear frame, stub axles having vertical arms journaled in bearings on the forward portion of said frame, steering wheels on said axles, a gear segment affixed to one of the axle arms, connections between the two axle arms, a vertical shaft journaled in a bearing affixed to the running gear frame, a gear affixed to said vertical shaft, and engaged with said gear segment, a spiral gear rotatively mounted on the body, and having a socket portion which is adapted to slide on the vertical shaft, the socket portion of said spiral gear and the portion of the shaft on which it slides being relatively formed to prevent one from rotating relatively to the other, a steering shaft mounted on the body, a transverse shaft and a longitudinal shaft, both journaled in bearings on the body, gears connecting the transverse shaft with the steering shaft, gears connecting the transverse shaft with the longitudinal shaft, and a spiral gear on the longitudinal shaft meshing with the spiral gear which slides on the vertical shaft.

In testimony whereof I have affixed my signature, in presence of two witnesses.

ARSENE PARÉ.

Witnesses:
ANNIE M. BABBITT,
SAMUEL A. HEWSON.